Dec. 22, 1953
R. C. FRIEDLY
2,663,270
COMPOSITE STUD
Filed May 25, 1949
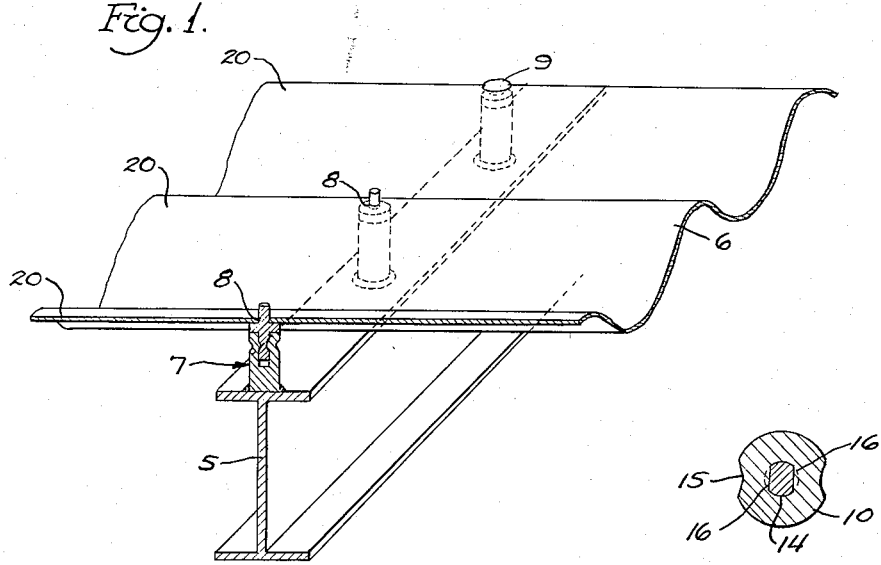
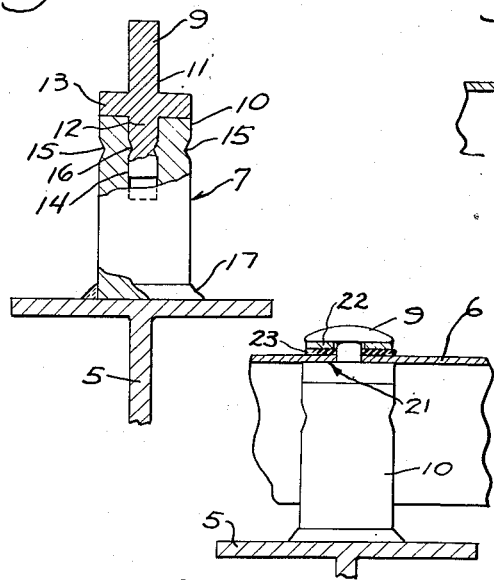
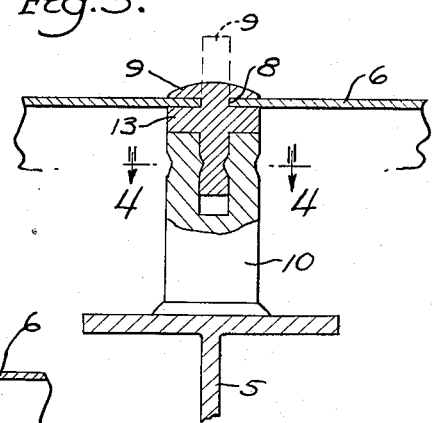
INVENTOR.
Robert C. Friedly
BY
Barnes, Kisselle, Laughlin & Raisch
Attorneys.

Patented Dec. 22, 1953

2,663,270

UNITED STATES PATENT OFFICE 2,663,270

COMPOSITE STUD

Robert C. Friedly, Lorain, Ohio, assignor to Gregory Industries, Inc., a corporation of Michigan Application May 25, 1949, Serial No. 95,307

6 Claims. (Cl. 108—13)

This invention relates to a stud and more particularly to a stud for securing an aluminum sheet to its supporting structure.

Sheet aluminum, particularly in corrugated form, is highly desirable for many purposes including roofing and other structural uses. I have found that sheet aluminum can be economically secured to its support such, for example, as the steel I-beams of a building structure, by means of steel studs which are electric arc welded at one end to the I-beam and have their other ends reduced in section to form a shoulder. The studs are pre-welded to the I-beam with a simple templet to locate the studs in the crown of the corrugation. The corrugated aluminum sheet is placed over the welded studs and the reduced section is drawn through the sheet by striking the sheet with a rubber mallet or by using a sheeter's rivet set and punch. A hole is thus punched in the sheet at the desired location for each stud and the reduced section is riveted. However, in trying out this method of securing corrugated sheet aluminum roofing to steel I-beams, I have found that the portion of the aluminum roofing around the stud where it is exposed to the weather and rain, soon corrodes or rusts away due to the galvanic action between the aluminum and the steel. This defect could be remedied by the use of a stainless steel stud, but stainless steel studs are too expensive. This defect cannot be remedied by the use of an aluminum stud because aluminum cannot be satisfactorily welded to steel.

It is an object of this invention to produce a stud which is satisfactory for the purposes above outlined and which can be produced and used economically and but with a very little increase in cost over that of a mild steel stud.

This object has been accomplished by making a composite stud consisting of a ferrous metal portion and an aluminum portion, the aluminum portion intervening between the ferrous portion and the aluminum roofing and also passing through the aluminum roofing and having the outer end thereof exposed to the weather. With such an aluminum to aluminum contact no galvanic action will occur.

In the drawings:

Fig. 1 is a fragmentary perspective showing my studs used for securing corrugated aluminum roofing to an I-beam.

Fig. 2 is an enlarged detail partly in section of my stud welded to an I-beam.

Fig. 3 is a fragmentary vertical section through the stud, roofing and I-beam showing the aluminum portion of the stud riveted over the aluminum roofing.

Fig. 4 is a section along the line 4—4 of Fig. 3.

Fig. 5 is a view similar to Fig. 3 showing the use of a composite aluminum and rubber washer.

Referring more particularly to the drawings there is shown an I-beam 5, such as the conventional structural steel I-beam, a sheet of aluminum 6 which is, by way of illustration, shown as a conventional corrugated aluminum roof sheet and composite stud generally designated 7.

My stud 7 comprises a ferrous body portion 10 which usually is a mild steel, and an aluminum portion 11. Aluminum portion 11 consists of a neck 9, a leg 12 and a circumferential shoulder portion 13. Body 10 is provided with a centrally positioned, axially extended recess 14. Recess 14 can be circular or of regular or irregular polygonal cross-section. The main point is that leg 12 of aluminum part 11 should project into and interengage body 10 in recess 14. Thus, leg 12 can have a screw fit or a press fit with body 10 in recess 14. Preferably, by way of description, I have shown leg 12 fitted into recess 14 and then the side wall of body 10 is indented on both sides as at 15 and leg 12 is correspondingly indented as at 16 to effectively lock aluminum tip 11 to body 10.

Stud 7 can be fixed to I-beam 5 in any suitable manner, but preferably the end of body 7 is electric arc welded as at 17 to beam 5 as taught by the United States patents to Nelson 2,413,189, 2,416,204 and Re. 22,411. Studs 7 are pre-welded to I-beam 5 with a simple templet to locate the studs in the crown of the corrugation. The corrugated aluminum sheet 6 is placed over the welded studs and the rivet extension 9 is drawn through the sheet 6 by striking the sheet with a rubber mallet or by using a sheeter's rivet set and punch. A hole 8 is thus punched in the sheet at the desired location for each stud 7. It will be noted that shoulder 13 effectively spaces aluminum sheet 6 from the ferrous portion 10 of each stud 7.

After sheet 6 has been positioned upon the studs, then neck portions 9 are riveted, pounded, or cold headed over, as shown in Fig. 3, and it will be noted that the neck portion 9 now completely fills, and has a press fit in, hole 8 in sheet 6 so that no water can pass from the out or upper or weather side of sheet 6 inwardly. It will, of course, be appreciated that I-beams 5 will be positioned within the building and shielded from the weather by aluminum roofing 6. No galvanic action will take place between aluminum tip 11 and ferrous or steel body 10 because the physical contact between these two bodies is positioned inside the building and not exposed to the outside weather. If desired, the stud 7 and aluminum insert 11 can be cadmium plated to remove the potential between the stud and the insert. Further, the fit between body 10 and insert 11 is tight in order to prevent moisture from coming between the two pieces, thus eliminating the possibility of galvanic action between the ferrous portion of the stud and the aluminum insert. Further, if desired, a waterproof glue or cement can be used in the joint between insert 11 and body 10 to seal out the moisture. The composite stud 7 has a length sufficient to hold the aluminum sheet 6 out of contact with the I-beam 5.

In Fig. 5 I have illustrated the use of a composite washer 21 which consists of an aluminum washer 22 to which has been securely bonded a rubber washer 23 of either natural or synthetic rubber. If desired, washer 23 can be made of "neoprene." The composite washer 21 is placed over the neck 9 and sheet 6 before the neck 9 is riveted over. Washer 21 assures a water-tight seal, increases the strength of the fastening by acting as a reinforcing agent and prevents tearing of the sheet during the riveting operation.

From the above it will be seen that I have produced a novel composite stud and a novel assembly of a sheet aluminum roof to an I-beam which is weather and corrosion proof and economical and cheap to install.

I claim:

1. A stud comprising a ferrous body portion shaped at one end thereof for end arc welding to a ferrous support and an aluminum tip portion interengagingly fixed to the other end thereof, said aluminum tip portion having a shoulder adjacent said body portion and a reduced neck extending from the shoulder on the side opposite said ferrous body portion.

2. A stud comprising a ferrous body portion shaped at one end thereof for end arc welding to a ferrous support and an aluminum tip portion interengagingly fixed to the other end thereof, said aluminum tip portion having a shoulder adjacent said body portion and a reduced neck extending from the shoulder on the side opposite said ferrous body portion, the said body portion being provided with a recess at said other end thereof and the aluminum tip having a leg projecting into, and fixed in, said recess in the body.

3. The stud claimed in claim 2 wherein the wall portion of the body surrounding the recess and the leg of the tip are indented to lock the tip into the body.

4. In a roof assembly, a sheet of aluminum having an opening therein, a support, a stud comprising a ferrous body portion end arc welded at one end to said support and positioned between the aluminum sheet and the support, an aluminum tip portion interengagingly secured to the other end of said ferrous body portion said aluminum tip portion having a shoulder overlying the last mentioned end of the ferrous body portion and extending between, and spacing, the ferrous body portion from the aluminum sheet, said aluminum tip having a reduced neck portion extending from said shoulder through said opening in the aluminum sheet for securing the sheet to the stud.

5. The combination claimed in claim 4 wherein the portion of the neck on the outside of said aluminum sheet is headed over the sheet around said opening and securely locks the sheet to the stud.

6. In a roof assembly, a sheet of aluminum having an opening therein, a support, a stud comprising a ferrous body portion end arc welded at one end to said support and positioned between the aluminum sheet and the support, an aluminum tip portion interengagingly secured to the ferrous body portion, said aluminum tip portion having a shoulder overlying the other end of the ferrous body portion and extending between, and spacing, the ferrous body portion from the aluminum sheet, said aluminum tip having a reduced neck portion extending from said shoulder through said opening in the aluminum sheet for securing the sheet to the stud, the portion of the neck on the outside of said aluminum sheet being headed over the sheet around said opening to securely lock the sheet to the stud, and an elastic washer between the headed over portion of the neck and the aluminum sheet.

ROBERT C. FRIEDLY.

References Cited in the file of this patent

UNITED STATES PATENTS

| Number | Name | Date |
|---|---|---|
| 1,548,061 | Pfeifer | Aug. 4, 1925 |
| 1,758,311 | Brown | May 13, 1930 |
| 1,930,187 | Abronski | Oct. 10, 1933 |
| 2,048,234 | Tucker | July 21, 1936 |
| 2,270,278 | Dunn | Jan. 20, 1942 |
| 2,374,270 | Brock | Apr. 24, 1945 |
| 2,612,394 | Nelson | Sept. 30, 1952 |

FOREIGN PATENTS

| Number | Country | Date |
|---|---|---|
| 377,643 | Great Britain | Jan. 19, 1931 |